United States Patent
Zhang et al.

(10) Patent No.: US 11,845,856 B2
(45) Date of Patent: *Dec. 19, 2023

(54) CELLULOSE-REINFORCED POLYPROPYLENE RESIN COMPOSITE MATERIAL, PREPARATION METHOD THEREFOR AND USE THEREOF

(71) Applicant: NIO TECHNOLOGY (ANHUI) CO., LTD, Hefei (CN)

(72) Inventors: Yihan Zhang, Shanghai (CN); Stephanie Waser, Munich (DE)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,417

(22) Filed: Dec. 20, 2022

(65) Prior Publication Data
US 2023/0121009 A1    Apr. 20, 2023

Related U.S. Application Data

(63) Continuation of application No. 17/734,569, filed on May 2, 2022.

(30) Foreign Application Priority Data

May 7, 2021    (CN) .......................... 202110494928.X

(51) Int. Cl.
*C08L 23/12* (2006.01)

(52) U.S. Cl.
CPC ......... *C08L 23/12* (2013.01); *C08L 2205/025* (2013.01); *C08L 2205/03* (2013.01)

(58) Field of Classification Search
CPC ........ C08L 23/12; C08L 2205/03; C08L 1/02; C08L 23/10
See application file for complete search history.

(56) References Cited

U.S. PATENT DOCUMENTS

| | | | | |
|---|---|---|---|---|
| 5,723,522 A | * | 3/1998 | Bergmann | ............... C08J 3/226 524/36 |
| 2007/0286894 A1 | * | 12/2007 | Marsh | .................... A61K 8/894 424/443 |

(Continued)

FOREIGN PATENT DOCUMENTS

| CN | 1371939 | 10/2002 |
|---|---|---|
| CN | 110857351 | 3/2020 |

(Continued)

OTHER PUBLICATIONS

Official Action with Machine Translation for China Patent Application No. 202110494928.X, dated Feb. 24, 2023, 12 pages.

(Continued)

*Primary Examiner* — Mark S Kaucher
(74) *Attorney, Agent, or Firm* — Sheridan Ross P.C.

(57) ABSTRACT

The invention relates to a cellulose-reinforced polypropylene resin composite material, a preparation method therefor and use thereof. The cellulose-reinforced polypropylene resin composite material comprises, relative to the total weight of the composite material: 65 wt % to 85 wt % of polypropylene resin; 10 wt % to 20 wt % of a cellulose filler; and 1 wt % to 10 wt % of dyed rayon, wherein the color of the dyed rayon is different from that of the polypropylene resin. The cellulose-reinforced polypropylene resin composite material of the invention is environmentally friendly and simple to process, and has a simple molding process. The article prepared therefrom has excellent physical and chemical properties, uniform matte appearance and two-color effect.

9 Claims, 1 Drawing Sheet

(56) References Cited

U.S. PATENT DOCUMENTS

| | | | |
|---|---|---|---|
| 2010/0222460 A1* | 9/2010 | Hojo | C08B 1/003 |
| | | | 524/35 |
| 2014/0100332 A1 | 4/2014 | Henry et al. | |
| 2014/0374044 A1* | 12/2014 | Samain | C08J 7/14 |
| | | | 525/61 |
| 2016/0244576 A1* | 8/2016 | Gobl | D01G 1/04 |
| 2019/0008697 A1* | 1/2019 | Heege | B32B 37/22 |
| 2020/0216624 A1 | 7/2020 | Hamilton et al. | |

FOREIGN PATENT DOCUMENTS

| | | |
|---|---|---|
| CN | 111206333 | 5/2020 |
| CN | 112457585 | 3/2021 |
| EP | 1689923 | 8/2006 |
| JP | 2019-172752 | 10/2019 |

OTHER PUBLICATIONS

Extended Search Report for European Patent Application No. 22165024.5, dated Jul. 28, 2022, 7 pages.
Official Action for U.S. Appl. No. 17/734,569, dated Mar. 7, 2023 14 pages.

* cited by examiner

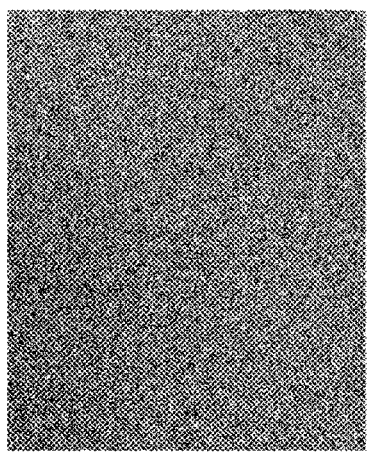

CELLULOSE-REINFORCED POLYPROPYLENE RESIN COMPOSITE MATERIAL, PREPARATION METHOD THEREFOR AND USE THEREOF

CROSS-REFERENCE TO RELATED APPLICATION

This application is a continuation of U.S. application Ser. No. 17/734,569, filed on May 2, 2022, which claims the benefit of China Patent Application No. 202110494928.X filed May 7, 2021, the entire contents of each which are incorporated herein by reference in their entireties.

TECHNICAL FIELD

The invention relates to the field of composite materials. Specifically, the invention relates to a cellulose-reinforced polypropylene resin composite material, a preparation method therefor and use thereof.

BACKGROUND ART

At present, a polycarbonate/acrylonitrile-butadiene-styrene (PC/ABS) system is used in most automotive interior and exterior trim parts, which has undergone many surface treatments, such as paint spraying, film pasting, transfer printing, and chromium plating, etc. There are also other types of materials such as real wood or real aluminum used as automotive interior and exterior trim parts. In general, these interior and exterior trim parts can highlight the personalization and harmony of the interior and exterior trim parts of a vehicle model. However, if interior and exterior trim parts made from these materials are expected to achieve rich appearance effects, complex technological means are needed, some processes will even cause a greater environmental burden, not to mention the disadvantages of high price and high rejection rate.

Fiber-reinforced thermoplastic composite materials are composite materials of resin matrix and reinforced fibers, which are made by impregnating fibers with thermoplastic resin matrix under strictly controlled conditions. Due to the advantages of short molding cycle and no chemical reaction during molding, fiber-reinforced thermoplastic composite materials are used in many fields such as automobiles, aerospace, electrical and electronic, and machinery.

The fillers of thermoplastic composite materials commonly used in vehicle materials are glass fibers or mineral powder. In recent years, there are some new types of fillers, such as wood powder, bamboo fibers or inorganic fillers. However, the lack of stability in appearance and performance, including odor VOC, limits the application of materials.

Polypropylene has become one of the most important general-purpose plastics due to its characteristics such as excellent comprehensive properties, wide sources, light weight, low price and easy formability. The development and application of modified polypropylene materials in automobiles has always been the focus of automobile industry and plastic industry. However, when modified polypropylene is supplied as a plastic part in the interior and exterior trim parts of automobiles, its plasticity has been criticized by consumers.

Reducing the gloss of polypropylene material is regarded as a method to reduce the plastic feeling. CN 201310713659.7 discloses a preparation method of a polypropylene composite material for low gloss hard plastic instrument panel. By adding short cut flat glass fibers, not only a material with a high surface hardness is obtained, but a matte effect is achieved, which reduces the gloss of the material and achieves the purpose of reducing the plastic feeling of the material.

How to make the materials of the automotive interior and exterior trim parts have the desired physical and chemical properties and appearance properties, and also be environmentally friendly is the goal actively pursued and constantly explored by the materials and automotive industry.

Therefore, it is expected to develop an environment-friendly material that is simple to process and can be used to produce automotive interior and exterior trim parts with excellent physical and chemical properties and good appearance.

SUMMARY OF THE INVENTION

An object of the invention is to provide an environment-friendly material that is simple to process and can be used to produce automotive interior and exterior trim parts with excellent physical and chemical properties and good appearance.

According to a first aspect of the invention, a cellulose-reinforced polypropylene resin composite material is provided, wherein it comprises, relative to the total weight of the composite material:
  65 wt % to 85 wt % of polypropylene resin;
  10 wt % to 20 wt % of a cellulose filler; and
  1 wt % to 10 wt % of dyed rayon,
  wherein the color of the dyed rayon is different from that of the polypropylene resin.

According to a second aspect of the invention, a method for preparing the above cellulose-reinforced polypropylene resin composite material is provided, wherein the corresponding raw materials are mixed, melted, extruded, cooled and granulated.

According to a third aspect of the invention, an article is provided, which is prepared from the above cellulose-reinforced polypropylene resin composite material.

In the cellulose-reinforced polypropylene resin composite material of the invention, cellulose fiber is used as the reinforcing filler to produce the matte effect, and the color difference between the dyed rayon and the polypropylene resin produces a two-color appearance. The composite material of the invention has low volatile organic compound (VOC) content, is environmentally friendly and simple to process. Compared with the polypropylene materials filled with mineral powder, the cellulose-reinforced polypropylene resin composite material of the invention has a lower density, and is an environmentally friendly and light weight material. The article prepared has excellent physical and chemical properties and uniform matte appearance, and exhibits double-color effect.

BRIEF DESCRIPTION OF THE DRAWINGS

The invention is described and explained in more detail below in combination with the accompanying drawing, wherein:

FIG. 1 shows a surface appearance photograph of the cellulose-reinforced polypropylene resin composite material sample plate prepared in Example 1.

DETAILED DESCRIPTION OF EMBODIMENTS

Hereinafter, various aspects of the invention and further objects, features and advantages will be more fully embodied.

Cellulose-Reinforced Polypropylene Resin Composite Material

According to a first aspect of the invention, a cellulose-reinforced polypropylene resin composite material is provided, wherein it comprises, relative to the total weight of the composite material:

65 wt % to 85 wt % of polypropylene resin;
10 wt % to 20 wt % of a cellulose filler; and
1 wt % to 10 wt % of dyed rayon,
wherein the color of the dyed rayon is different from that of the polypropylene resin.

The polypropylene resin can be polypropylene resins commonly used in the field of plastic processing, for example at least one of homo-polypropylene, block co-polypropylene and random co-polypropylene.

Preferably, the melt flow index of the polypropylene resin is in the range of 12 to 30 g/10 min, preferably 15 to 25 g/10 min, as measured under the conditions of 2.16 Kg load and 230° C. according to ISO 1133.

Preferably, the content of the polypropylene resin is 70 wt % to 80 wt % relative to the total weight of the composite material.

The cellulose filler can be any suitable cellulose.

Preferably, the cellulose filler is derived from one or more of wood, cotton, wheat straw, hemp and rice straw. More preferably, the cellulose filler is selected from wood pulp or cotton pulp.

Preferably, the cellulose filler is white or light colored without dyeing.

Preferably, the cellulose filler has a diameter ranging from 20 to 60 μm, and a length ranging from 0.5 to 1 mm More preferably, the cellulose filler has a diameter ranging from 40 to 60 μm, and a length ranging from 0.7 to 1 mm.

Preferably, the content of the cellulose filler is 12 wt % to 18 wt % relative to the total weight of the composite.

In this application, the term "dyed rayon" refers to the rayon that has been dyed.

As is well known to those skilled in the art, rayon is a silky artificial fiber that is composed of cellulose. The preparation of rayon is a well-known technology in the art and will not be described in detail herein.

The dyed rayon can be of any color, provided that it is different from the color of polypropylene resin.

Preferably, the dyed rayon has a diameter ranging from 10 to 20 μm, and a length ranging from 0.3 to 0.8 mm.

Preferably, the content of the dyed rayon is 2 wt % to 9 wt %, preferably 3 wt % to 8 wt %, and more preferably 4 wt % to 7 wt %, relative to the total weight of the composite material.

According to the invention, by selecting the dyed rayon material with the above length and diameter, on the premise of ensuring that the cellulose-reinforced polypropylene resin composite material meets certain mechanical requirements, the uniform dispersibility of the dyed rayon in the composite material is also realized, such that the article made of the composite material has an optimized appearance effect.

Preferably, the cellulose-reinforced polypropylene resin composite material also comprises a pigment.

The pigment is selected from organic pigments and inorganic pigments.

As an example, the organic pigment can be Permanent Red, Permanent Yellow, Phthalocyanine Blue, Phthalocyanine Green, etc.

As an example, the inorganic pigment can be titanium dioxide, carbon black, iron oxide red, iron oxide black, etc.

Optionally, the pigment is added in the form of color masterbatch.

Preferably, the particle size of the pigment is in the range of 0.1 to 5 μm, preferably 0.1 to 2 μm.

If present, preferably, the content of the pigment is 1 wt % to 6 wt % relative to the total weight of the composite.

In some embodiments, the cellulose-reinforced polypropylene resin composite material comprises a white pigment, and the dyed rayon is black.

In some embodiments, the cellulose-reinforced polypropylene resin composite material comprises no pigments.

The cellulose-reinforced polypropylene resin composite material can also include additives commonly used in the field of fiber-reinforced resin composite materials, including but not limited to antioxidants (e.g. antioxidant 1010), light stabilizers (e.g. hindered amine light stabilizer 770), mold release agents, free radical scavengers (e.g. Lignostab®1198), compatibilizers (e.g. maleic anhydride grafted polypropylene), etc.

Those skilled in the art can select additives and adjust their usage amount as needed.

The cellulose-reinforced polypropylene resin composite material of the invention shows a two-color effect due to the different colors of the polypropylene resin matrix and dyed rayon, and the cellulose filler is uniformly and densely distributed in the polypropylene resin matrix, such that the product prepared has an uniform matte appearance. Moreover, due to the composite reinforcing effect of the cellulose filler and the dyed rayon, the articles obtained meet certain mechanical properties. In addition, the cellulose-reinforced polypropylene resin composite material of the invention has less VOC emission and is environmentally friendly.

In some embodiments, the article prepared from the cellulose-reinforced polypropylene resin composite material of the invention has a flexural modulus of up to 2000 MPa and a flexural strength of up to 45 MPa as measured according to ISO 178, a tensile strength of up to 34 MPa as measured according to ISO 527-2, and a notched impact strength of up to 4.8 KJ/m$^2$ as measured according to ISO 179.

The cellulose-reinforced polypropylene resin composite material of the invention can be used to prepare products with certain mechanical properties, matte appearance and two-color effect, for example automobile interior and exterior trim parts, such as automobile pillars, door panels, bumpers, trim strips, instrument panels, etc.

Preparation of Cellulose-Reinforced Polypropylene Resin Composite Material

According to a second aspect of the invention, a method for preparing the above cellulose-reinforced polypropylene resin composite material is provided, wherein the corresponding raw materials are mixed, melted, extruded, cooled and granulated.

The corresponding raw materials mentioned in the application refer to the raw materials needed to constitute the cellulose-reinforced polypropylene resin composite material. Specifically, the corresponding raw materials refer to one or more of polypropylene resins, cellulose fillers and dyed rayon defined for the cellulose-reinforced polypropylene resin composite material, as well as optionally pigments, antioxidants, light stabilizers, mold release agents, free radical scavengers and compatibilizers.

The melting process is carried out at a temperature at which the polypropylene resin is melted.

Those skilled in the art can select the melting temperature of polypropylene resin according to the polypropylene resin used, such as 190 to 230° C.

The preparation of the cellulose-reinforced polypropylene resin composite material can be carried out using equipment commonly used in the art, such as single screw extruder or twin screw extruder.

In some embodiments, the raw material mixture is melt extruded in a twin-screw extruder at 190-230° C., cooled and pelletized to obtain the resulting cellulose-reinforced polypropylene resin composite material.

The obtained cellulose-reinforced polypropylene resin composite material can be in the form of particles (or slices).

Articles Prepared from Cellulose-Reinforced Polypropylene Resin Composite Material According to a third aspect of the invention, an article is provided, which is prepared from the above cellulose-reinforced polypropylene resin composite material.

The articles can be for example, automobile interior and exterior trim parts, such as automobile pillars, door panels, bumpers, trim strips, instrument panels, etc.

The articles can be prepared by injection molding process, injection-compression molding process, melt extrusion molding process or blow molding process, etc., which are well known in the art.

Those skilled in the art can select appropriate molding process parameters according to the composition of the cellulose-reinforced polypropylene resin composite material.

The cellulose-reinforced polypropylene resin composite material particles prepared according to the second aspect of the invention can be used to prepare the article, or the molten composite material can be directly transported to the subsequent molding equipment to prepare the article after the melting step described in the method of the second aspect of the invention.

The articles have uniform matte appearance and meets the requirements of mechanical properties.

In some embodiments, the article obtained has a flexural modulus of up to 2000 MPa and a flexural strength of up to 45 MPa as measured according to ISO 178, a tensile strength of up to 34 MPa as measured according to ISO 527-2, and a notched impact strength of up to 4.8 KJ/m² as measured according to ISO 179.

In this application, the terms "include" and "comprise" cover the case where other elements not explicitly mentioned are also included or comprised, and the case composed of the mentioned elements.

Unless otherwise defined, all technical and scientific terms used herein have the same meaning as commonly understood by those skilled in the art to which the invention belongs. When the definitions of terms in the description conflict with the meaning generally understood by those skilled in the art to which the invention belongs, the definition described herein shall prevail.

Unless otherwise stated, all values used in the description and claims to express the amount, temperature, etc. of components are understood to be modified by the term "about". Therefore, unless indicated to the contrary, the numerical parameters described herein are approximate values that can vary according to the desired performance that needs to be achieved.

EXAMPLES

The concept, specific structure and the generated technical effects of the invention will be further described below with reference to embodiments and accompanying drawing, such that those skilled in the art can fully understand the purposes, features and effects of the invention. It will be readily understood by those skilled in the art that the examples herein are only for exemplary purposes, and the scope of the invention is not limited thereto.

Raw Materials Used

Polypropylene resin: the melt flow index is 15 g/10 min, as measured under 2.16 Kg load and 230° C. according to ISO 1133.

Cellulose filler: wood pulp, the diameter is 40 μm, and the length is 0.7 mm.

White pigment: titanium dioxide, the particle size is 0.2 μm.

Black rayon: the diameter is 15 μm, and the length is 0.5 mm.

Compatibilizer: maleic anhydride grafted polypropylene, the grafting rate is 0.7% to 0.9%, and the melt index (190° C., 2.16 kg) is >85 g/10 min.

Antioxidant: antioxidant 1010.

Light stabilizer hindered amine light stabilizer 770.

Free radical scavenger: Lignostab® 1198.

Example 1

The polypropylene resin, cellulose filler, white pigment, black rayon, compatibilizer, antioxidant, light stabilizer, free radical scavenger, etc. are evenly mixed according to the amounts shown in Table 1, and then extruded with ZSK-25 twin-screw extruder (from Coperion company) at 190 to 230° C., wherein the feeding speed is 800 to 1200 Kg/h and the screw speed ss 500 to 800 rpm, same is cooled and pelletized to obtain slices.

TABLE 1

| Raw materials | Parts by weight |
| --- | --- |
| Polypropylene resin | 71 |
| Cellulose filler | 15 |
| White dye | 3 |
| Black rayon | 5 |
| Compatibilizer | 5 |
| Antioxidant | 0.6 |
| Light stabilizer | 0.2 |
| Free radical scavenger | 0.2 |

The obtained slices were processed into a test sample plate (with a size of 150 mm*100 mm*2 mm) by the injection molding process shown in Table 2.

TABLE 2

| Injection molding process | |
| --- | --- |
| Screw temperature (° C.) | 190/185/175/165 |
| Mold temperature (° C.) | 50-80 |

FIG. 1 shows a surface appearance photograph of the prepared cellulose-reinforced polypropylene resin composite material sample plate. It has an uniform matte appearance and two-color effect.

The density and mechanical properties of the obtained test sample plate are tested, and the results are summarized in Table 3.

TABLE 3

| Test items | Unit | Test standard | Results |
| --- | --- | --- | --- |
| Density | g/cm³ | ISO 1183A | 0.985 |
| Tensile strength | MPa | ISO 527-2 | 34.7 |

TABLE 3-continued

| Test items | Unit | Test standard | Results |
|---|---|---|---|
| Flexural strength | MPa | ISO 178 | 45.2 |
| Flexural modulus | MPa | | 2006 |
| Notch impact strength | KJ/m$^2$ | ISO 179 | 4.8 |

It can be seen from Table 3 that the density of the test sample plate is low and can meet the requirements of conventional mechanical properties.

According to test standard NIO-TP.GS.004, the obtained test sample plate (with a size of 150 mm*100 mm*2 mm) is placed in a 10 L bag at 65° C. for 2 hours, the content of the volatile organic compound (VOC) is tested, and the results are summarized in Table 4.

TABLE 4

| Test items | Results (μg/m$^3$) |
|---|---|
| Benzene | 8 |
| Toluene | 21 |
| Ethylbenzene | 27 |
| Xylene | 91 |
| Styrene | 30 |
| Formaldehyde | 47 |
| Acetaldehyde | 124 |
| Acrylic aldehyde | N.D. |

Note:
N.D. indicates not ben is detected.

It can be seen from Table 4 that the test sample plate has low content of VOC.

According to test standard NIO-TP.GS.002, 20 g of the injection molding sample plate is taken and put in a 1 L glass container. The test conditions are shown in Table 5 below (wherein "variables" 1, 2 and 3 in Table 5 refer to the test conditions in corresponding row, respectively).

TABLE 5

| Variables | Temperature (° C.) | Storage time |
|---|---|---|
| 1 | 23 ± 2 | 24 ± 1 h |
| 2 | 50 ± 2 | 2 h ± 10 min |
| 3 | 80 ± 2 | 2 h ± 10 min |

The test results are shown in Table 6 below (wherein the "results" in Table 6 represent the odor evaluation grade of the materials under different test conditions, respectively, and the specific meaning of the grades can be found in the standard NIO-TP.GS.002 in detail).

TABLE 6

| Variables | Results |
|---|---|
| 1 | 3 |
| 2 | 3.5 |
| 3 | 3.5 |

It can be seen from the results in Table 6 that the test sample plate meets the requirements for odor grade in the art.

Only the exemplary embodiments or examples of the invention have been described above, and they are not intended to limit the invention. For those skilled in the art, various modifications and changes can be made on the invention. Any modifications, equivalent replacements, and improvements made without departing from the spirit and principle of the invention shall fall within the scope of the claims of the present application.

The invention claimed is:

1. A cellulose-reinforced polypropylene resin composite material, wherein it comprises, relative to the total weight of the cellulose-reinforced polypropylene resin composite material:
   65 wt % to 85 wt % of polypropylene resin;
   10 wt % to 20 wt % of a cellulose filler; and
   1 wt % to 10 wt % of dyed rayon,
   wherein
   the color of the dyed rayon is different from that of the polypropylene resin,
   the cellulose filler is white or light colored without dyeing,
   the cellulose filler is different than the dyed rayon,
   the cellulose filler has a diameter ranging from 40 to 60 μm, and a length ranging from 0.7 to 1 mm,
   the dyed rayon has a diameter ranging from 10 to 20 μm, and a length ranging from 0.3 to 0.8 mm.

2. The cellulose-reinforced polypropylene resin composite material according to claim 1, wherein the cellulose filler is derived from one or more of wood, cotton, wheat straw, hemp and rice straw.

3. The cellulose-reinforced polypropylene resin composite material according to claim 1, wherein the content of the dyed rayon is 2 wt % to 9 wt % relative to the total weight of the composite material.

4. The cellulose-reinforced polypropylene resin composite material according to claim 1, wherein the cellulose-reinforced polypropylene resin composite material also comprises a pigment.

5. The cellulose-reinforced polypropylene resin composite material according to claim 4, wherein the content of the pigment is 1 wt % to 6 wt % relative to the total weight of the composite material.

6. The cellulose-reinforced polypropylene resin composite material according to claim 1, wherein the cellulose-reinforced polypropylene resin composite material also comprises an additive selected from: antioxidants, light stabilizers, mold release agents, free radical scavengers and compatibilizers.

7. A method for preparing the cellulose-reinforced polypropylene resin composite material according to claim 1, wherein the corresponding raw materials are mixed, melted, extruded, cooled and granulated.

8. An article, wherein it is prepared from the cellulose-reinforced polypropylene resin composite material according to claim 1.

9. The article according to claim 8, wherein the article is an automobile interior or exterior trim part.

* * * * *